US006179076B1

United States Patent

Fernie et al.

(10) Patent No.: US 6,179,076 B1
(45) Date of Patent: Jan. 30, 2001

(54) MOTORIZED CHAIR BASE

(75) Inventors: Geoffrey R. Fernie, Islington; Gerald T. Griggs, Scarborough, both of (CA)

(73) Assignee: Sunnybrook & Women's College Health Sciences Centre, North York (CA)

( * ) Notice: Under 35 U.S.C. 154(b), the term of this patent shall be extended for 0 days.

(21) Appl. No.: 09/166,531

(22) Filed: Oct. 6, 1998

(51) Int. Cl.[7] ........................................ B60K 1/00
(52) U.S. Cl. ........................ 180/65.1; 180/907; 280/304.1
(58) Field of Search ............................ 180/65.1, 21, 22, 180/907, 908; 280/304.1, 250.1

(56) References Cited

U.S. PATENT DOCUMENTS

| | | | | |
|---|---|---|---|---|
| 4,455,031 | * | 6/1984 | Hosaka | 280/250 |
| 5,183,133 | * | 2/1993 | Roy et al. | 180/252 |
| 5,435,404 | * | 7/1995 | Garin, III | 180/907 |
| 5,445,233 | * | 8/1995 | Fernie et al. | 180/907 |
| 5,848,658 | * | 12/1998 | Pulver | 180/65.1 |
| 5,853,059 | * | 12/1998 | Goetzen et al. | 180/65.6 |
| 5,899,475 | * | 5/1999 | Verhaeg et al. | 280/250.1 |
| 5,904,214 | * | 5/1999 | Lin | 180/907 |
| 5,944,131 | * | 8/1999 | Schaffner et al. | 180/65.1 |
| 5,964,473 | * | 10/1999 | Degonda et al. | 280/907 |

* cited by examiner

*Primary Examiner*—Paul N. Dickson
(74) *Attorney, Agent, or Firm*—Philip C. Mendes da Costa; Bereskin & Parr

(57) ABSTRACT

A base for receiving a seat has a longitudinally extending chassis having a front end, a rear end, a central portion positioned therebetween and opposed sides extending longitudinally between the front and rear ends; at least one drive wheel mounted below the central portion; a plurality of rotatably mounted wheels positioned around the chassis and mounted at a fixed distance below the chassis; and a biasing member associated with the at least one drive wheel to bias the at least one drive wheel to engage the surface on which the base is situated and reduce the weight supported by the rotatably mounted wheels whereby the rotatably mounted wheels support sufficient weight of the base and the unoccupied seat to define a stable platform.

20 Claims, 5 Drawing Sheets

MOTORIZED CHAIR BASE

FIELD OF THE INVENTION

This invention relates to a motorized base for a transportation device, such as a wheelchair, a stretcher, or the like.

BACKGROUND OF THE INVENTION

Traditionally, powered wheelchairs have two drive wheels at the rear and two castor wheel, at the front. These chairs drive like a car in that they pivot about the rear of the chair. Accordingly, such motorized wheelchairs are generally adapted for movement either along a straight line or along a steered curved arc, somewhat in the same manner as an automobile. They require a significant turning radius and, as with a car, many manoeuvres must be executed backwards. Further, these chairs tend to lose traction on downward slopes since the rear drive wheels tend to become unloaded.

If it is desired to realign the wheelchair, for movement from one fixed position in an entirely new direction, it is typically necessary to go through complex turning manoeuvres, somewhat similar to the three point turn utilized on occasion in operating an automobile. The manoeuvres require a significant amount of space and many tight spaces must be approached backwards in a manner similar to a car reversing into a parking spot. These complex manoeuvres are sometimes difficult for disabled persons to carry out.

There are some powered chairs where the powered drive wheels are at the front. However, these chairs also require a large turning radius and tend to lose traction when going uphill.

In addition, existing motorized wheelchairs frequently have difficulty in traversing uneven flooring or terrain or when travelling along an incline, such as a wheelchair ramp, and may lose traction In U.S. Pat. No. 5,445,233, (Fornie et at.), the free running wheels were urged into contact with the ground via a spring mounted around the shaft. Accordingly, for example, if the wheelchair of Fernie et al were travelling in a forward direction and encountered uneven terrain, the front wheels could pivot upwardly or downwardly about the shaft while ensuring that the drive wheels remained in contact with the ground. The spring would continually urge the free running wheels into engagement with the ground to stabilize the wheelchair and thereby prevent the wheelchair from tipping over.

One disadvantage with this approach was that the free running wheels would rock forward to backward and/or side to side as a person sat down or stood up from the wheelchair. This produced a sensation that the wheelchair was unstable and would cause concern to a disabled person. This was undesirable as midwheel drive chairs are garnering a reputation as being unstable.

In order to enable the occupant of the chair to reach objects positioned on a low shelf or on the ground, the chair included a shaft having two telescoping sleeves. One of the sleeves was connected to the seat of the chair and the other was connected to the drive wheels. A motor was used to extend or retract one of the telescoping sleeves thus raising or lowering the seat of the chair. While this design achieved the goal of allowing a person to reach low lying objects, it has several disadvantages. First, it necessitated the use of complex gearing and a the incorporation of a further motor into the design of the wheelchair. This constituted additional parts which were subject to wear and tear and potential failure. Further, the parts substantially added to the cost of the wheelchair thereby restricting the ability of some disabled people to acquire the wheelchair.

SUMMARY OF THE PRESENT INVENTION

In accordance with this invention, there is provided a base for receiving a seat comprising:

(a) a longitudinally extending chassis having a front end, a rear end, a central portion positioned therebetween and opposed sides extending longitudinally between the front and rear ends;

(b) at least one drive wheel mounted below the central portion;

(c) a plurality of rotatably mounted wheels positioned around the chassis and mounted at a fixed distance below the chassis; and (d) a biasing member associated with the at least one drive wheel to bias the at least one drive wheel to engage the surface on which the base is situated and reduce the weight supported by the rotatably mounted wheels whereby the rotatably mounted wheels support sufficient weight of the base and the unoccupied seat to define a stable platform.

In accordance with another embodiment of this invention, there is provided a motorized chair comprising (a) a longitudinally extending chassis having a front end, a rear end, a central portion positioned therebetween, opposed sides extending longitudinally between the front and rear ends and a seat mounted thereon;

(b) at least one drive wheel mounted below the central portion;

(c) a plurality of rotatably mounted wheels positioned around the chassis, the plurality of rotatably mounted wheels including a pair of forward wheels; and, (d) a biasing member to maintain contact between the at least one drive wheel and the surface on which the base is situated and, when a person of average weight is seated in the seat, the forward pair of rotatably mounted wheels support up to 25% of the weight of the occupied chair.

In one embodiment, the at least one drive wheel comprises two drive wheels, each of which is driven by a motor. The at least one drive wheel preferably supports a major proportion of the weight of the base and the unoccupied seat. The at least one drive wheel may support at least 75% of the weight of the base and the unoccupied seat, preferably more than 85%, more preferably more than 90% and, most preferably, about 95%.

In another embodiment, when a person is seated in a seat affixed to the base, the rotatably mounted wheels support a major proportion of the weight of the person, preferably, the weight of the person is evenly divided between each of the rotatably mounted wheels, In another embodiment, the rotatably mounted wheels include a pair of forward wheels and, when a person of average weight is seated in a seat affixed to the base, the forward pair of rotatably mounted wheels support up to 25% of the weight of the occupied seat.

In accordance with another embodiment of this invention, there is provided a base for receiving a seat comprising:

(a) a longitudinally extending chassis having a front end, a rear end, a central portion positioned therebetween and opposed sides extending longitudinally between the front and rear ends;

(b) at least one drive wheel mounted on the central portion to engage the surface on which the base is positioned;

(c) a plurality of rotatably mounted wheels positioned around the chassis and mounted below the chassis to engage the surface on which the base is positioned; and, (d) a forward compartment positioned adjacent the front end for receiving at least one battery and a rearward compartment positioned adjacent the rear end for receiving at least one battery.

The base may further comprise batteries positioned in the forward and rearward compartments with the weight of the batteries being essentially evenly divided between the forward and rearward compartments.

One advantage of the instant design is that it provides a stable low profile base for a chair, stretcher or the like. Accordingly, even though the base may be used in the construction of a midwheel drive chair, the base is stable not only when a user is entering or exiting the chair, but also while the chair is in operation over a variety of terrain. Further, the base maintains good stability and traction when travelling up or down a ramp. This is particularly important when traversing uneven terrain (such as a bumpy road), or going up or down an incline (such as a ramp into a house or a building, particularly where it is necessary to turn either to the left or to the right while proceeding up the ramp).

Further, given the low height of vans, it is particularly suitable for a person who has the ability to drive a motor vehicle as the wheelchair may easily enter, travel through and exit a van which has been adapted for a handicapped person.

More importantly, even with its low profile, the motorized chair base is particularly adapted to provide sufficient power to the drive wheels. The battery compartments which are positioned fore and aft are sufficiently large to receive four sealed lead acid type UI batteries (12V, approximately 35 Ahr). The batteries may be wired to deliver approximately 70 Ahr of energy at 24V. This is substantially more than the battery power which is typically provided to wheelchairs which are currently on the market namely 50 Ahr at 24V or less.

BRIEF DESCRIPTION OF THE DRAWING

These and other advantages of the instant invention will be more fully and particularly understood in connection with the following description of a preferred embodiment of the invention in which.

DESCRIPTION OF PREFERRED EMBODIMENT

Figure 1:
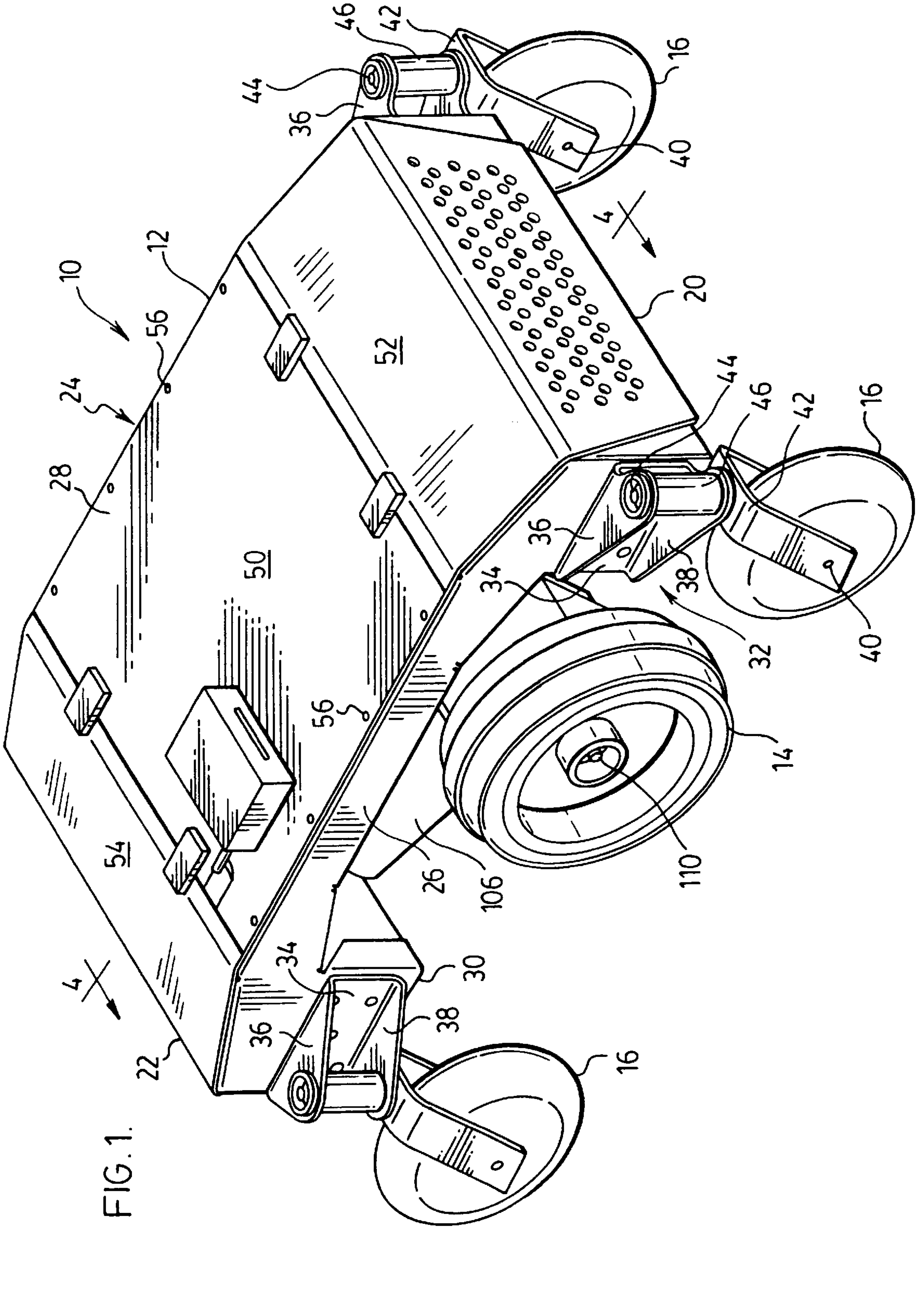
FIG. 1 is a perspective view of the motorized chair base according to the instant invention.
Figure 2:
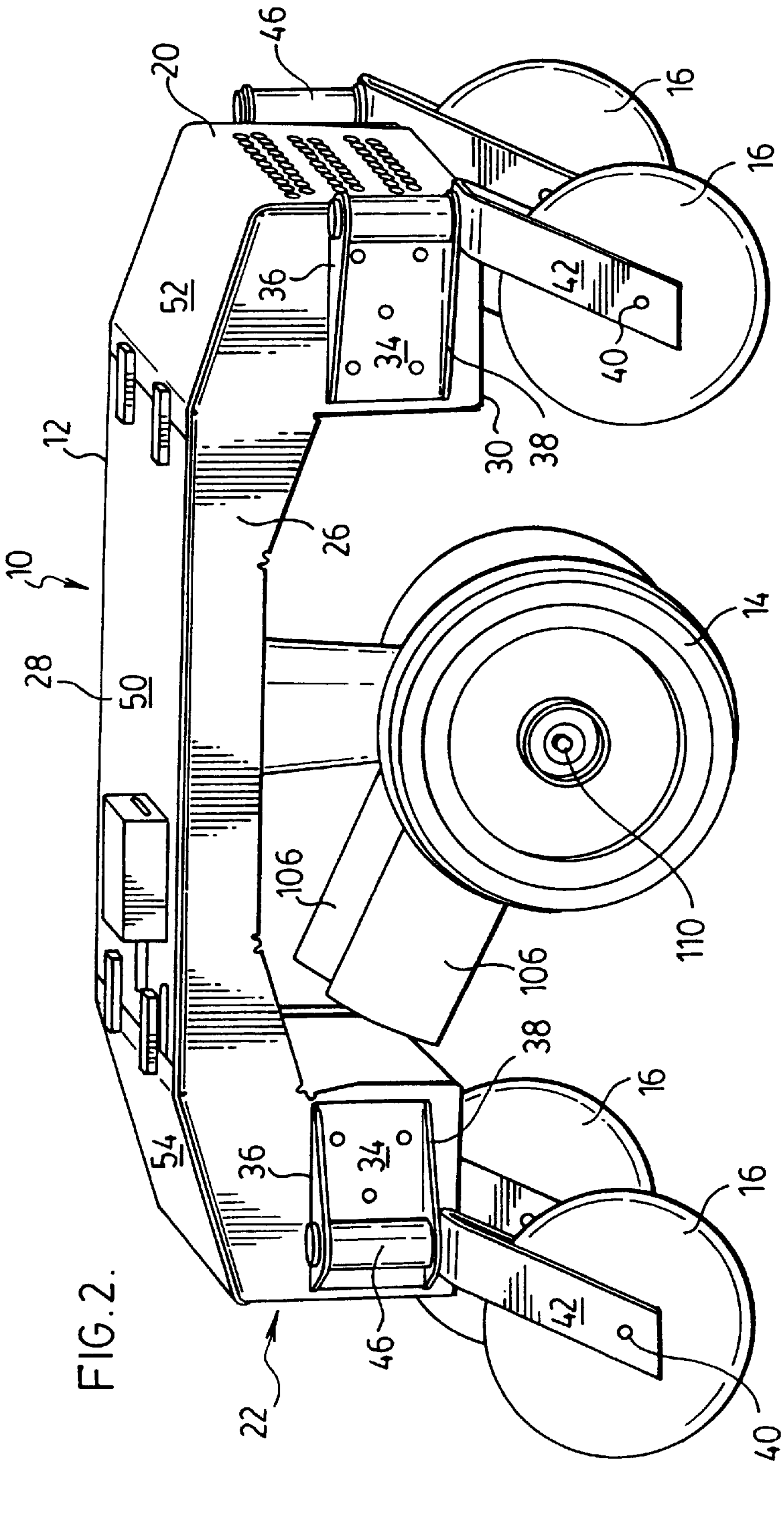
FIG. 2 is a side view of the motorized chair base of FIG. 1.

As shown in FIG. 1, motorized base chair 10 comprises a chassis 12, drive wheels 14 and free running wheels 16.

Figure 4:
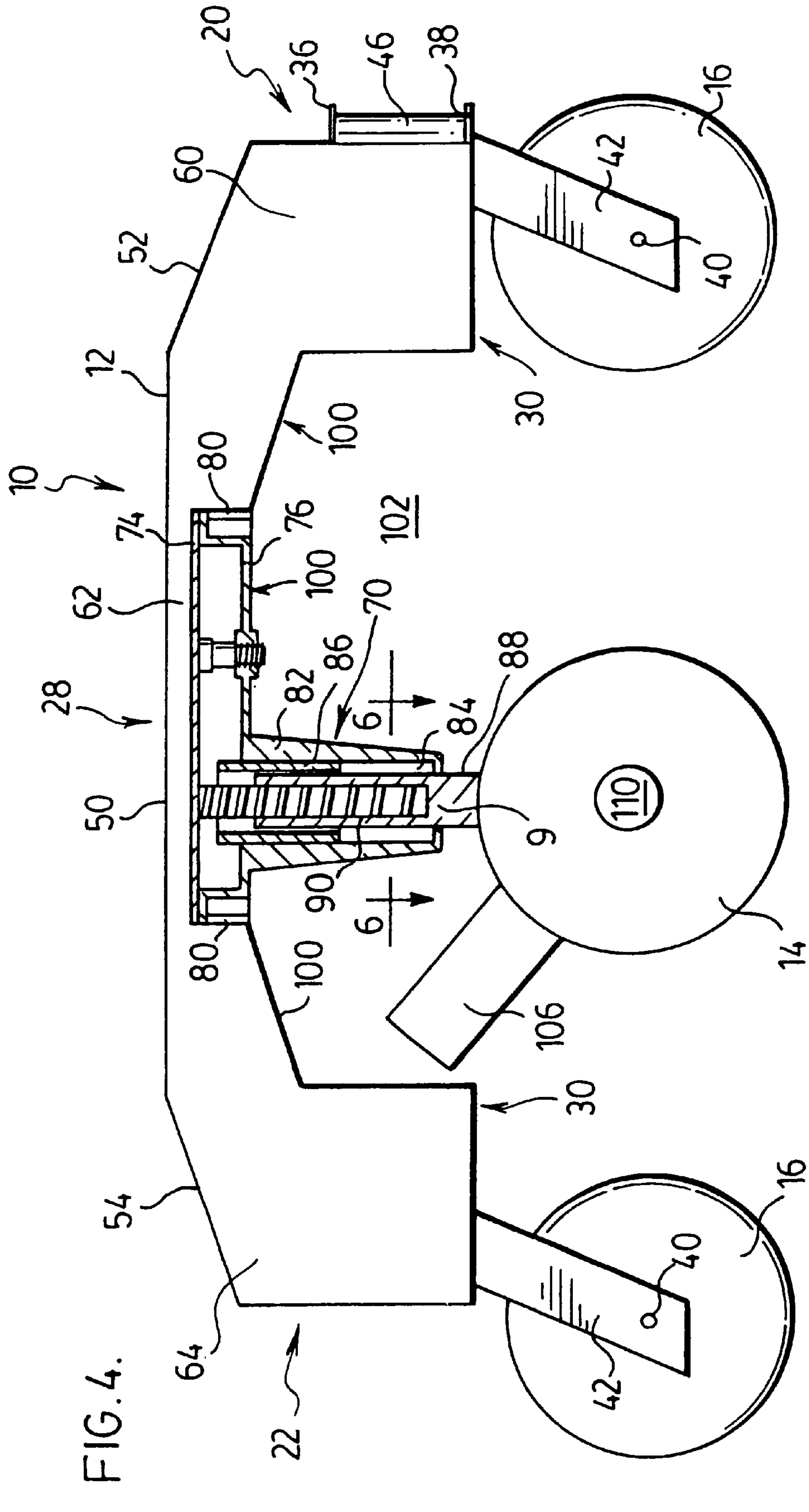
FIG. 4 is a cross-section along the line 4—4 of FIG. 1.

Chassis 12 has a front end 20, a rear end 22, a first opposed side 24 extending between front and rear ends 20 and 22, a second opposed side 26 extending between front and rear ends 20 and 22, a top 28 and a bottom 30 (see FIG. 4).

Base 10 may be used in the manufacture of a motorized transport device, such as a wheelchair or to support a stretcher or trolley to support a load. The following description is based on the use of base 10 for a wheelchair; however, it will be appreciated that base 10 may be modified to receive thereon the superstructure of a stretcher or other transportation device. Accordingly, a seat (not shown) may be affixed to top surface 28 by any means known in the art. Preferably, the seat which is affixed to the chair is a seat for a wheelchair so that, when assembled, the unit comprises a wheelchair. Motorized chair base 10 is particularly adapted for use in the industry as it may easily be adapted to receive any existing wheelchair seat or the like. Front end 20 is defined by the direction which a person faces when seated in the chair which is affixed to the wheelchair.

Chassis 12 may be made from any particular construction which will provide the requisite strength to support a person when seated in a seat or chair affixed to motorized base chair 10, For example, chassis 12 may be manufactured from a series of sheet metal parts which may be manufactured by, for example, a stamping process or the like. These sheet metal parts may be assembled by any means known in the art to form chassis 12. Alternately, it will be appreciated that chassis 12 may be manufactured from high strength materials such as high strength plastics, carbon reinforced composite materials and other similar materials which are known in the industry. Accordingly, a variety of manufacturing techniques may be utilized to manufacture and assemble chassis 12. The preferred techniques utilize a thin wall construction so as to maximize the internal space of chassis 12 to receive the various components discussed below.

In the preferred embodiment, a plurality of rotatably mounted wheels 16 are positioned around the chassis and mounted at a fixed distance below the chassis. Free running wheel 16 are positioned so as to provide a stable base for chassis 12 when a person is entering or exiting the wheelchair. A free running wheel is preferably provided adjacent each corner of base 10.

Free running wheels 16 may be fixed to chassis 12 by means of brackets 32. A pair of brackets 32 are preferably positioned on each opposed side 24, 26 and spaced apart so as to be adjacent front and rear ends 20, 22. Bracket 32 has a vertically extending central portion 34 which is positioned between upper and lower arms 36 and 38 and is affixed to one of the sides 24, 26 by any means known in the art, such as by screws, rivets, welding or the like. Spacer 46 is affixed to arms 36 and 38 and is counterbored at each end to receive a bearing at each end.

Free running wheels 16 are rotatably mounted on axle 40, Axle 40 is mounted in U shaped bracket 42. Shaft 44 is affixed to U shaped bracket 42 and has a shoulder (not shown) to abut against the lower face of the lower arm 38. In order to rotatably mount wheel 16 on bracket 32, vertically extending shaft 44 extends upwardly from U shaped bracket 32 through an opening provided in lower arm 38, through spacer 46 and through an opening provided in upper arm 36. Shaft 44 may be lockingly held in position by any means known in the art such as a set screw, a set washer or shaft 44 may have a threaded end to receive a nut, or the like. Accordingly, each wheel 16 may independently rotate and follow along a path set by drive wheels 14.

It will be appreciated that more than four wheels 16 may be freely rotatably mounted to chassis 12. Further, it will be appreciated that each of the four wheels 16 may be positioned internal of the perimeter of chassis 12. For example, a recess (not shown) may be provided in bottom 30 for rotatably receiving shaft 44 or a bracket 32. It will be appreciated that any means known in the art may be used to rotatable mount wheels 16 to chassis 12.

As shown in FIG. 1, top 28 comprises centre top panel 50, front top panel 52 and rear top panel 54. It will be appreciated that top 28 may comprise only a single panel. Further, the top panel or panels may be secured to chassis 12 by any means known in the art. For example, as shown in FIG. 1, top centre panel 50 is secured in position by means of a plurality of screws 56.

Figure 3:
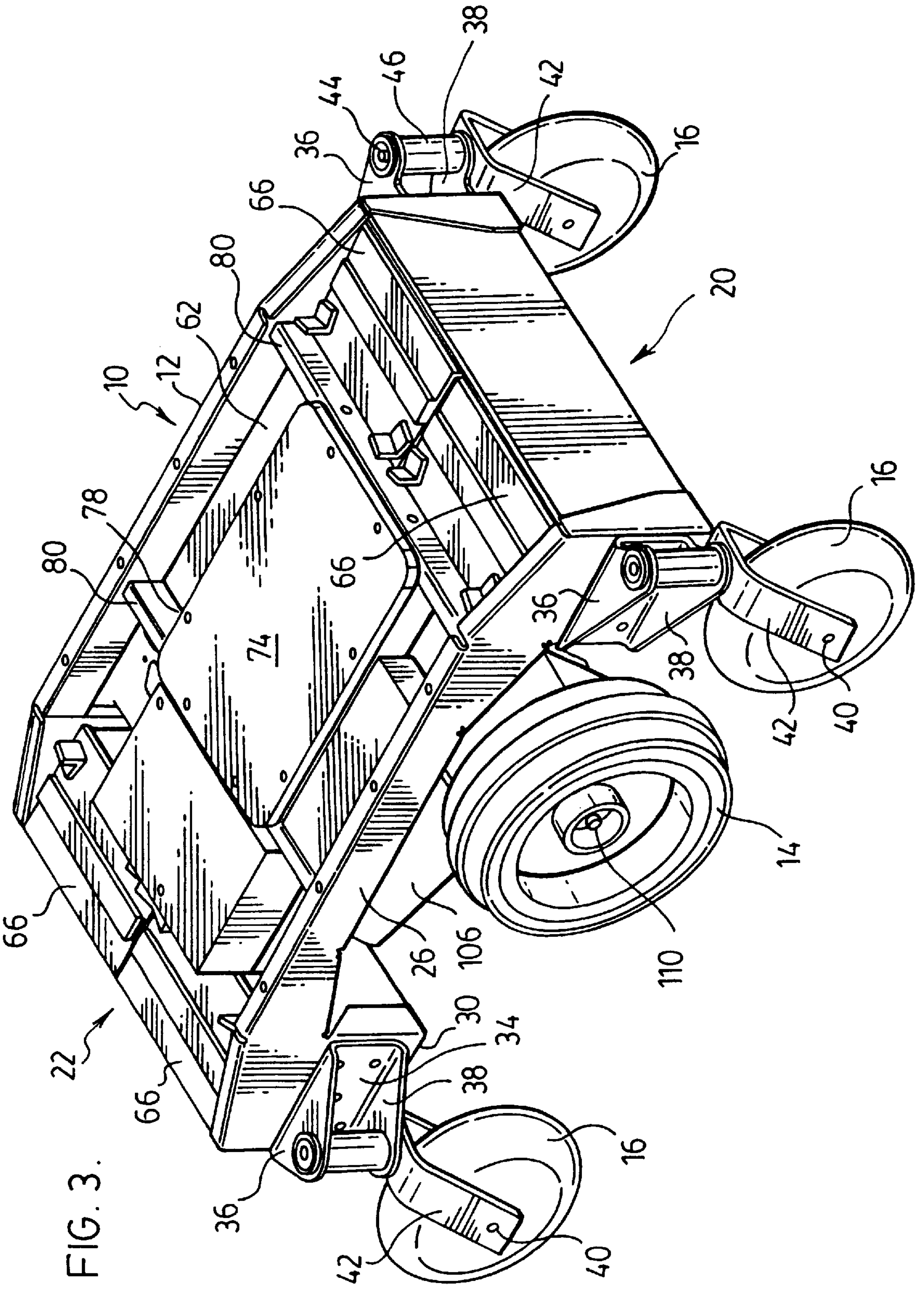
FIG. 3 is a perspective view of the motorized chair base of FIG. 1 with the top panels removed.

In FIG. 3, top centre panel 50 and front and rear top panels 52 and 54 have been removed showing the internal configuration of chassis 12. Chassis 12 has forward compartment 60, central compartment 62 and rearward compartment 64 (see also FIG. 4). These compartments define sufficient storage space for the electronic motor controls for base 10 as well as the batteries to power the motor for base 10. For example, in the preferred embodiment, two batteries 66 may be positioned in forward compartment 60 and two battery 66 may be positioned in rearward compartment 64.

One advantage of the instant design is that each compartment 60 and 64 is sufficiently large to accommodate two currently available batteries which will providing ample power to the motor for the drive wheels. It will be appreciated that the size and configuration of the battery which is received in the compartment 60 and 64 may scary depending upon those available in the marketplace and the power which is to be delivered to the motor drive of wheels 14. It will be appreciated that as battery technology improves, an increase number of smaller batteries capable of delivering even more power may be positioned in compartment 60 and 64.

It will be appreciated that each battery 66 is relatively heavy. For example, a battery 66 may weigh in the order of 25 pounds. Accordingly, each of forward compartments 60 and rearward compartment 64 may provide a storage space for 50 pounds of battery. Thus, the weight of the batteries may be equally divided between the front end 20 of base 10 and rear end 22 of base 10.

Figure 5:
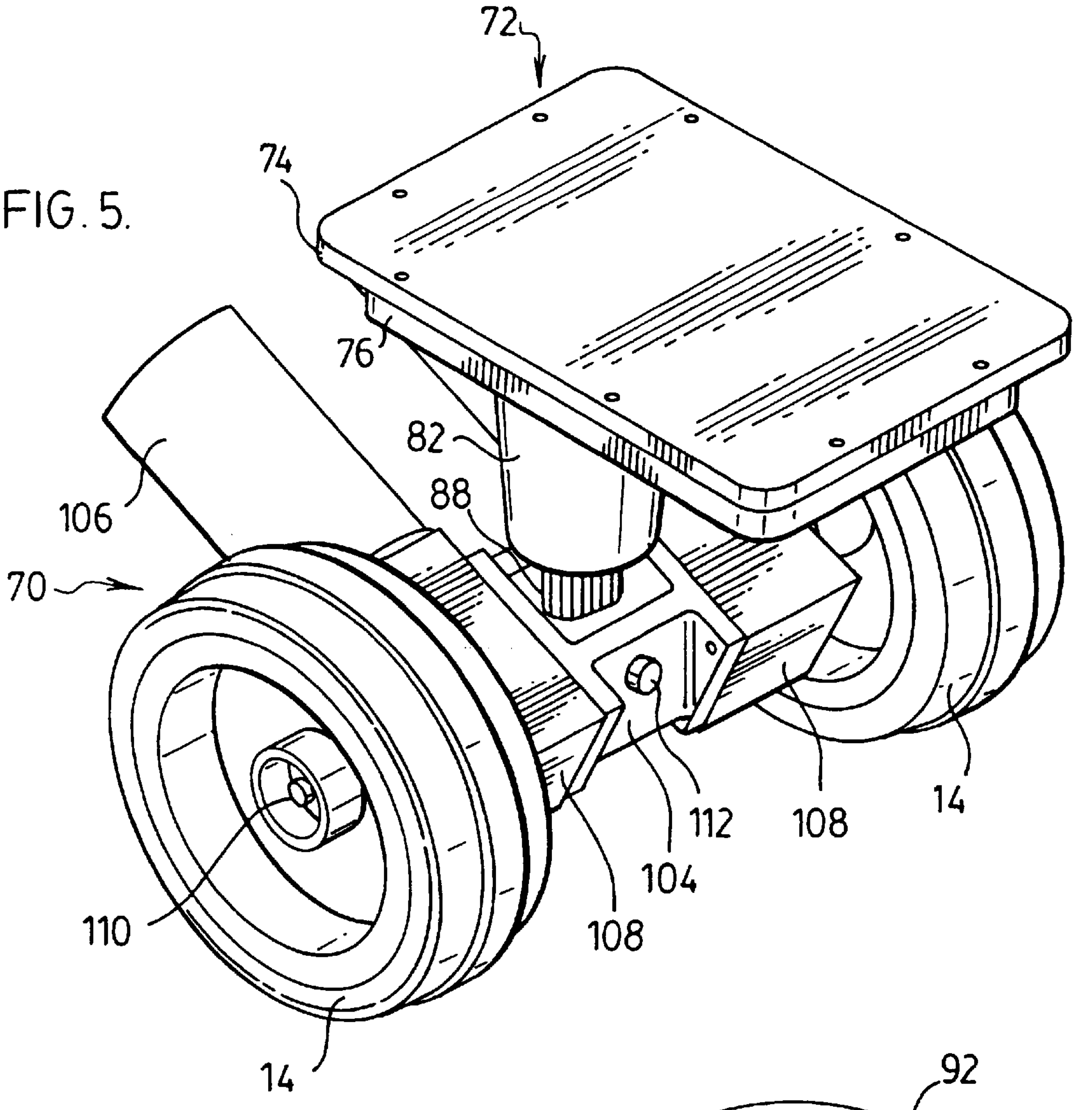
FIG. 5 is a perspective view of the tractor for the motorized base shown in FIG. 4; and, FIG. 6 is a cross-section along the line 6—6 of FIG. 4.

Tractor 70, which is shown in FIG. 5, is mounted in base 10 as shown in FIG. 4. Accordingly, the drive wheels 14 are positioned centrally on base 10 between front and rear ends 20 and 22 and effectively immediately below the person when seated in the chair affixed to base 10.

In the preferred embodiment, tractor 70 has an upper housing 72 comprising upper plate 74 and lower plate 76. Upper plate 74 may be secured to lower plate 76 by any means known in the art such as screws 78 (see FIG. 3). Upper housing 72 is used to secure tractor 70 in central compartment 62. Accordingly, central compartment 62 may be provided with two transversely extending support members 8O onto which upper housing 72 may be secured by any means known in the art, such as screws.

The support shaft for drive wheels 14 extends downwardly from upper housing 72. Drive wheels 14 are mounted below housing 72 and biased so as to maintain their engagement with the ground upon which base 10 is positioned. In the preferred embodiment, wheels 14 are mounted on a telescoping shaft which is biased, such as by a spring, to engaging the ground. It will be appreciated that other suspension means for biasing wheels 14 into the ground engaging position shown in FIG. 4 may be utilized, including, eg., biased struts or suspension arms.

Drive wheels 14 are biased so as Lo receive a substantial job portion of the weight of an unoccupied chair when it is mounted onto base 10. For example, the weight of base 10, including batteries, the motor drive for wheels 14 and a chair mounted on base 10 may be in the order of about 100 kilograms. A substantial portion of this weight is supported by drive wheels 14. In the preferred embodiment, drive wheels 14 may support 75% of this weight, preferably more than 85% of this weight, more preferably than 90% of this weight, and most preferably, about 95% of this weight. It will thus be seen that free running wheels 16 do not support very much weight of an unoccupied chair but are in engagement with the ground. When a person is seated in the chair, due to the biasing member, the weight of the person will be distributed, preferably evenly, amongst free running wheels 16. Due to compression of the free running wheels, some this weight may be supported by drive wheels 14. However, the amount of the weight of the person which is supported by drive wheels 14 may be minimal (eg. in the order of 5% to 10% or less). Any of this weight which is supported by the drive wheels would be beneficial as it would increase the traction between drive wells 14 and the ground.

A typical adult male may weigh in the order of 100 kg. Accordingly, excluding mechanical losses, free running wheels 16 will essentially support all of this weight while drive wheels 14 are supporting essentially the entire weight of the unoccupied chair (also about 100 kilograms). If the weight of the person is evenly distributed amongst the four free running wheels 16, then the forward pair of free running wheels 16 and the rearward pair of free running wheels 16 will each support approximately 50 kg. while the centre drive wheel will support approximately 100 kg. Thus, about 25% of the weight of the loaded wheelchair will be supported by each of the forward and rearward pairs of free running wheels 16 and 50% of the weight of the loaded wheelchair will be supported by drive wheels 14.

This configuration has particular advantages. First, the weight which is supported by drive wheels 14 ensure that they stay in contact with the ground. As the surface which the base traverses varies in height, the biasing member will allow drive wheels to retract upwardly or extend downwardly so as to follow the profile of the ground. Thus the dynamic stability of the chair is improved, even when in motion, since about half or more of the weight of a loaded wheelchair is supported by centrally positioned drive wheels 14. This provides substantial advantages, including increased traction by drive wheels 14, when a wheelchair incorporating base 10 travels up or down an inclined plane, such as a ramp for a handicapped person.

Further, in a typical wheelchair, approximately 40% to 60% of the weight of a loaded wheelchair is supported by the front pair of wheels. With the design of the instant invention, only about 25% of the weight of a loaded wheelchair is supported by the front pair of wheels (or less if the individual is lighter, such as an adult female who may weigh 50 to 60 kg.). Thus, despite the fact that the forward pair of free running wheels 16 are fixed in position relative to bottom 30 of base 10, this allows the forward pair of free running wheels 16 to move upwardly so as to roll over bumps and low curbs, such as those at the beginning of a ramp. The decreased amount of weight being supported by wheels 16 compared to the same wheels on a typical wheelchair allows a wheelchair incorporating base 10 to more easily pass over an uneven terrain.

A further advantage is that, if the terrain is soft such as grass, it is less likely that forward wheels 16 will plough into the ground resulting in the wheel chair becoming stuck.

Figure 6:
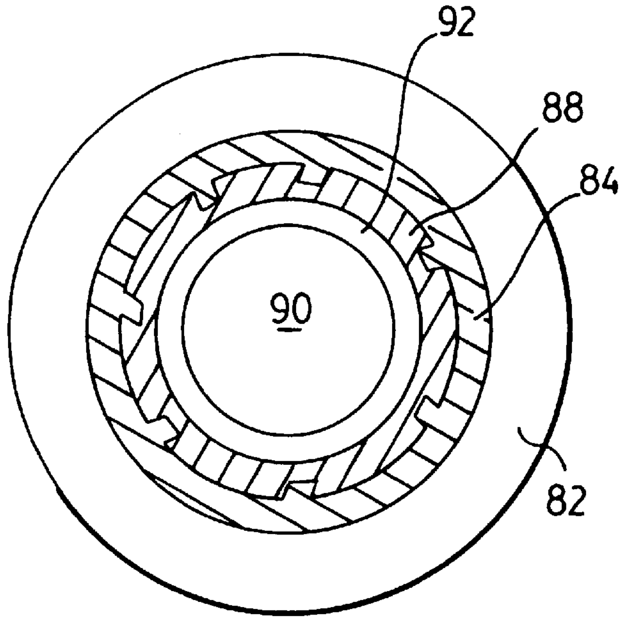

In the preferred embodiment, a central shaft mount 82 is positioned below upper housing 72 (see FIGS. 4–6) for providing a support member for receiving the members which permit the telescoping vertical motion of drive wheels 14. Centrally positioned within central shaft mount 82 is mount 86 for receiving spline bushing 84. Spline bushing 84 has a cental opening for receiving spline shaft 88. The splines of bushing 84 are positioned so as to mate with splines provided in shaft 88 so as to permit shaft 88 to move upwardly or downwardly with respect to upper housing 72. In this manner, it will be appreciated that shaft 88 is non-rotatably mounted in central shaft mount 82. It will be apparent to those skilled in the art that other mechanisms may be used to non-rotatably mount shaft 88 with respect to mount 82. It will also be appreciated that in some embodiments, it may be desirable to include a mechanism to permit shaft 88 to rotate with respect to upper housing 72, such as is described in Fernie et al. which is incorporated here and by reference.

Spring 90 is centrally positioned within spline shaft 88 so as to bias drive wheels 14 to the ground engaging position. As shown in FIG. 4, spring 90 is positioned in hollow core 92 of spline shaft 88 and extends from bottom 94 of hollow core 92 upwardly so as to engage the bottom surface of upper plate 74. This maintains tension in spring 90 and forces drive wheels 14 downwardly. It will be appreciated that if spring 90 exerts too great a tensile force, drive wheels 14 will extend downwardly below the plane defined by free running wheels 16 and accordingly free running wheels 16 will not define a stable platform for base 10. Accordingly, spring 90 exerts a sufficient tensile strength so that drive wheel 14 and free running wheel 16 engage the ground while base 10 is stationary and, preferably, with only a minimal amount of weight being supported by free running wheels 16.

Drive wheels 14 may be driven by any motor known in the art. Referring to FIG. 4, bottom 30 of chassis 12 has a recessed central portion 100 so as to define a cavity 102 positioned below recess portion 100 within which the motor drive for drive wheel 14 may be received. It will be appreciated that by extending opposed sides 24, 26, all or a portion of the motor drive for wheels 14 may be included within chassis 12.

Referring to FIG. 5, spline shaft 88 is mounted on lower shaft support 104. Preferably, each of drive wheels 14 is connected to the motor so that they may independently rotate clockwise or counter clockwise. Therefore, a motor 106 is preferably provided for each drive wheel 14. Each motor 106 may be drivingly connected to a transfer case 108 which has an associated axle 110. Drive wheel 14 is non-rotatably mounted on axle 110 so as to rotate with axle 110. Motors 106 may be angled upwardly from the horizontal so as to be recessed in cavity 102. Further, by angling motors 106 upwardly, the likelihood that motors 106 may be damaged by contact with the ground or surface debris is reduced.

In order to permit both drive wheels to remain in contact with the ground over various terrain, the drive wheels 14 are preferably mounted to pivot in a plane transverse to the direction of travel of base 10. As shown in FIG. 5, shaft support 104 may be pivotally mounted about shaft 88 by means of pivot 112. Thus, as base 10 travels over uneven terrain, one drive wheel 14 may move upwardly while the other may move downwardly without any, or any significant amount of, traction.

It will be appreciated by those skilled in the art that varying numbers of drive wheels 14 may be provided. Further, the two drive wheels may be operated by a single motor 106, if desired, such that they will always both rotate in the same direction. Further, base 10 may be adapted for use with non-motorized drive wheels. In such an embodiment, wheels 14 may be the regular drive wheels used on a manually operated wheel chair. In such a case, no battery or motor for the drive wheels is required. However, this design still provides a stable base with mid wheel drive for improved manoeuvrability.

We claim:

1. A base comprising:

(a) a longitudinally extending chassis having a front end, a rear end, a central portion positioned there between and opposed sides extending longitudinally between the front and rear ends;

(b) at least one drive wheel mounted below the central portion;

(c) a plurality of rotatably mounted wheels positioned around the chassis in front and behind the at least one drive wheel and mounted at a fixed distance below the chassis to engage the surface on which the base is situated; and, (d) a biasing member associated with the at least one drive wheel to bias the at least one drive wheel to engage the surface on which the base is situated.

2. The base as claimed claim 1 wherein the at least one drive wheel comprises two drive wheels, each of which is driven by a motor.

3. The base as claimed in claim 1 further comprising a seat mounted on the base wherein the at least one drive wheel supports a major proportion of the weight of the base and the seat when the seat is unoccupied.

4. The base as claimed in claim 1 further comprising a seat mounted on the base wherein, when a person is seated in the seat, the rotatably mounted wheels support a major proportion of the weight of the person.

5. The base as claimed in claim 4 wherein, the weight of the person evenly divided between each of the rotatably mounted wheels.

6. The base as claimed in claim 1 further comprising a seat mounted on the base wherein the at least one drive wheel supports at least 75% of the weight of the base and the seat when the seat is unoccupied.

7. The base as claimed in claim 1 wherein the rotatably mounted wheels include a pair of forward wheels and, when a person is seated in a seat affixed to the base, the forward pair of rotatably mounted wheels support up to 25% of the weight of the occupied seat.

8. The base as claimed in claim 1 further comprising a seat affixed thereto such that the base and seat together comprise a wheelchair.

9. A motorized chair comprising:

(a) a longitudinally extending chassis having a front end, a rear end, a central portion positioned there between, opposed sides extending longitudinally between the front and rear ends and a seat mounted thereon;

(b) at least one drive wheel mounted below the central portion;

(c) a plurality of vertically fixed rotably mounted wheels positioned around the chassis in front and behind the at least one drive wheel; and, (d) a biasing member to maintain contact between the at least one drive wheel and the surface on which the base is situated and, when a person is seated in the seat, the weight of the person is evenly divided between the rotatably mounted wheels.

10. The chair as claimed in claim 9 wherein the at least one drive wheel comprises two drive wheels, each of which is driven by a motor.

11. The chair as claimed in claim 9 wherein the at least one drive wheel supports a major proportion of the weight of the chair.

12. The chair as claimed in claim 11 wherein, when a person is seated in the chair, the rotatably mounted wheels support essentially all of the weight of the person.

13. The chair as claimed in claim 12 wherein, the at least one drive wheel supports at least 75% of the weight of the chair.

14. The chair as claimed in claim 9 wherein the at least one drive wheel supports at least 95% of the weight of the chair.

15. A wheelchair comprising:

(a) a longitudinally extending chassis having a front end, a rear end, a central portion positioned there between and opposed sides extending longitudinally between the front and rear ends;

(b) at least one drive wheel mounted on the central portion to engage the surface on which the wheelchair is positioned; and (c) a plurality of rotatably mounted wheels positioned around the chassis in front and behind said at least one drive wheel and mounted below the chassis to engage the surface on which the wheelchair is positioned at a fixed distance wherein the at least one drive wheel supports more than 90% of the weight of the wheelchair when the wheelchair is unoccupied.

16. The wheelchair as claimed in claim 15 further comprising batteries positioned in forward and rearward compartments, the weight of the batteries being essentially evenly divided between the forward and rearward compartments.

17. The wheelchair as claimed in claim 15 further comprising a biasing member to bias the at least one drive wheels to engage the surface on which the wheelchair is situated wherein the at least one drive wheel supports a minor proportion of the weight of a person when seated in the wheelchair.

18. The wheelchair as claimed in claim 17 wherein, when a person is seated on the wheelchair the rotatably mounted wheels support a major proportion of the weight of the person and the weight of the person is generally equally divided between the rotatable mounted wheels.

19. The wheelchair as claimed in claim 15 wherein the at least one drive wheel supports at least 95% of the weight of the wheelchair.

20. The wheelchair as claimed in claim 15 wherein the rotatably mounted wheels include a pair of forward wheels and a pair of rearward wheels and, when a person is seated on the wheelchair each rotatably mounted wheel supports about 25% of the weight of the person.

* * * * *

US006179076C1

(12) EX PARTE REEXAMINATION CERTIFICATE (5293rd)

United States Patent

Fernie et al.

(10) Number: US 6,179,076 C1

(45) Certificate Issued: Mar. 7, 2006

(54) MOTORIZED CHAIR BASE

(75) Inventors: Geoffrey R. Fernie, Islington, CA (US); Gerald T. Griggs, Scarborough, CA (US)

(73) Assignee: Sunnybrook & Women's College Health Sciences Centre, North York (CA)

Reexamination Request:
No. 90/006,042, Jun. 22, 2001

Reexamination Certificate for:

| | |
|---|---|
| Patent No.: | **6,179,076** |
| Issued: | **Jan. 30, 2001** |
| Appl. No.: | **09/166,531** |
| Filed: | **Oct. 6, 1998** |

(51) Int. Cl.
*G60K 1/00* (2006.01)

(52) U.S. Cl. .................... 180/65.1; 180/907; 280/304.1

(58) Field of Classification Search ................ 180/65.1, 180/21, 22, 907, 908; 280/304.1, 250.1
See application file for complete search history.

(56) References Cited

U.S. PATENT DOCUMENTS 3,380,546 A * 4/1968 Rabjohn ...................... 180/15
4,475,611 A * 10/1984 Fisher ......................... 180/11
5,083,625 A 1/1992 Bleicher .................... 180/65.1
5,348,326 A * 9/1994 Fullenkamp et al. ......... 280/43

FOREIGN PATENT DOCUMENTS

| | | | |
|---|---|---|---|
| EP | 0 927 551 | A1 | 7/1998 |
| FR | 2735019 | A1 | 12/1996 |
| JP | 58 063575 | A | 4/1983 |

* cited by examiner

*Primary Examiner*—James S. McClellan

(57) ABSTRACT

A base for receiving a seat has a longitudinally extending chassis having a front end, a rear end, a central portion positioned therebetween and opposed sides extending longitudinally between the front and rear ends; at least one drive wheel mounted below the central portion; a plurality of rotatably mounted wheels positioned around the chassis and mounted at a fixed distance below the chassis; and a biasing member associated with the at least one drive wheel to bias the at least one drive wheel to engage the surface on which the base is situated and reduce the weight supported by the rotatably mounted wheels whereby the rotatably mounted wheels support sufficient weight of the base and the unoccupied seat to define a stable platform.

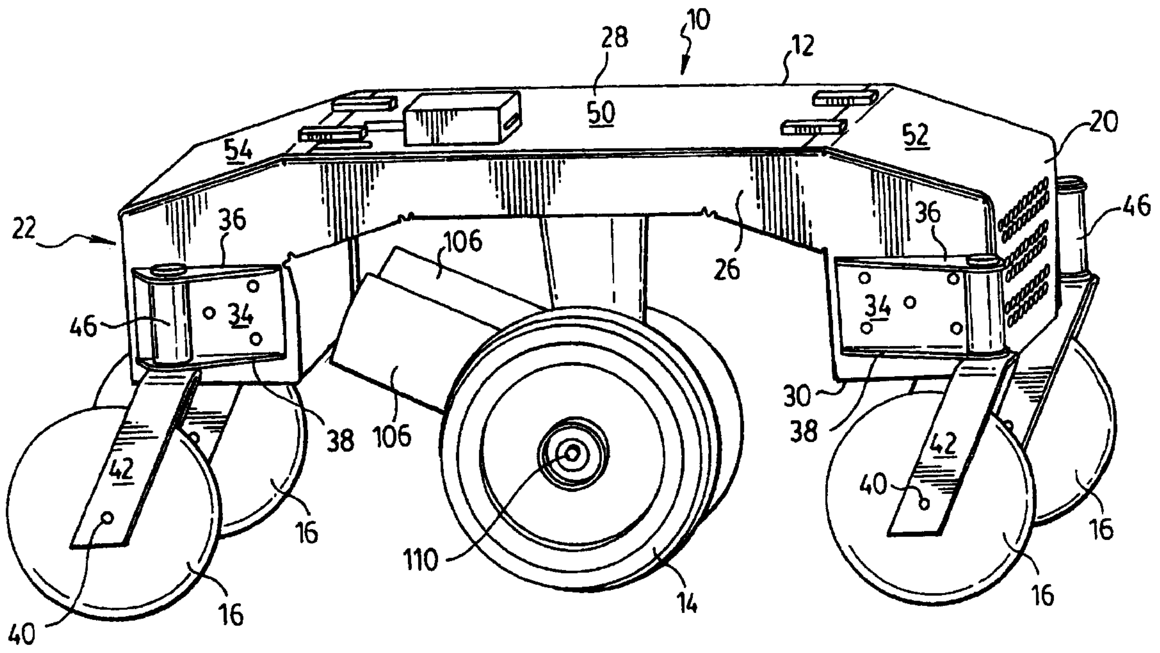

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 8–25:

In accordance with this invention, there is provided a base for receiving a seat comprising:

(a) a longitudinally extending chassis having a front end, a rear end, a central portion positioned therebetween [and], opposed sides extending longitudinally between the front and rear ends *and a seat*;

(b) [at least one drive wheel mounted below the central portion;

(c)] a plurality of rotatably mounted wheels positioned around the chassis and mounted at a fixed distance below the chassis *to define a plane*; [and]

*(c) at least one drive wheel mounted below the central portion, the at least one drive wheel is moveable between a first position above the plane and a second position below the plane, the plurality of rotatably mounted wheels are mounted in front and behind the at least one drive wheel, the at least one drive wheel supports a major proportion of the weight of the base when the base is unloaded and when the base is positioned on a flat surface; and,*

(d) a biasing member associated with the at least one drive wheel to bias the at least one drive wheel to engage the surface on which the base is situated [and reduce the weight supported by the rotatably mounted wheels whereby the rotatably mounted wheels support sufficient weight of the base and the unoccupied seat to define a stable platform] *whereby the biasing member allows the at least one drive wheel to retract upwardly or extend downwardly so as to allow the at least one drive wheel to follow the profile of the surface, wherein the at least one drive wheel supports at least 75% of the weight of the base and the seat when the seat is unoccupied.*

Column 2, lines 26–43:

In accordance with another embodiment of this invention, there is provided a motorized chair comprising (a) a longitudinally extending chassis having a front end, a rear end, a central portion positioned therebetween, opposed sides extending longitudinally between the front and rear ends and a seat mounted thereon;

(b) [at least one drive wheel mounted below the central portion;

(c)] a plurality of rotatably mounted wheels positioned around the chassis[, the plurality of rotatably mounted wheels including a pair of forward wheels; and,] *and vertically fixed at a distance below the chassis to define a plane;*

*(c) at least one drive wheel mounted below the central portion, the at least one drive wheel is moveable between a first position above the plane and a second position below the plane, the plurality of rotatably mounted wheels are mounted in front and behind the at least one drive wheel; and,*

(d) a biasing member to maintain contact between the at least one drive wheel and the surface on which the base is situated and, when a person of average weight is seated in the seat, the [forward pair of rotatably mounted wheels support up to 25% of the weight of the occupied chair] *weight of the person is evenly divided between the rotatably mounted wheels.*

Column 2, line 62 to column 3, line 9:

In accordance with another embodiment of this invention, there is provided a [base for receiving a seat] *wheelchair* comprising:

(a) a longitudinally extending chassis having a front end, a rear end, a central portion positioned therebetween and opposed sides extending longitudinally between the front and rear ends;

(b) at least one drive wheel mounted on the central portion to engage the surface on which the [base] *wheelchair* is positioned; *and,*

(c) a plurality of rotatably mounted wheels positioned around the chassis *in front and behind the at least one drive wheel* and mounted below the chassis to engage the surface on which the [base] *wheelchair* is positioned [; and, (d) a forward compartment positioned adjacent the front end for receiving at least one battery and a rearward compartment positioned adjacent the rear end for receiving at least one battery] *at a fixed distance wherein the at least one drive wheel supports more than 90% of the weight of the wheelchair when the wheelchair is unoccupied.*

AS A RESULT OF REEXAMINATION, IT HAS BEEN DETERMINED THAT:

Claims 3, 6, 8–11, 13 and 18–20 are cancelled.

Claims 1, 2, 4, 5, 7, 12 and 14–17 are determined to be patentable as amended.

New claims 21 and 22 are added and determined to be patentable.

1. A [base] *motorized wheelchair* comprising:

(a) a longitudinally extending chassis having a front end, a rear end, a central portion positioned there between [and], opposed sides extending longitudinally between the front and rear ends *and a seat*;

(b) [at least one drive wheel mounted below the central portion;

(c)] a plurality of rotatably mounted wheels positioned around the chassis in front and behind [the] at least one drive wheel and mounted at a fixed distance below the chassis to [engage the surface on which the base is situated; and,] *define a plane, said rotatably mounted wheels are not biased;*

*(c) said at least one drive wheel mounted below the central portion, the at least one drive wheel is moveable between a first position above the plane and a second position below the plane, said at least one drive wheel is rotatably mounted about an axis perpendicular to said plane;*

(d) a biasing member associated with the at least one drive wheel to bias the at least one drive wheel to engage

[the] *a* surface on which the [base] *motorized wheelchair* is situated *whereby the biasing member allows the at least one drive wheel to follow the profile of the surface, wherein the at least one drive wheel supports at least 75% of the weight of the wheelchair when the seat is unoccupied.*

2. The [base] *motorized wheelchair* as claimed *in* claim 1, wherein the at least one drive wheel comprises two drive wheels, each of which is driven by a motor.

4. The [base] *motorized wheelchair* as claimed in claim 1 [further comprising a seat mounted on the base] wherein, when a person is seated in the seat, the rotatably mounted wheels support a major proportion of the weight of the person.

5. The [base] *motorized wheelchair* as claimed in claim 4 wherein, the weight of the person *is* evenly divided between each of the rotatably mounted wheels.

7. The [base] *motorized wheelchair* as claimed in claim 1 wherein the rotatably mounted wheels include a pair of forward wheels *and a pair of rearward wheels* and, when a person is seated in [a] *the* seat affixed to the [base] *motorized wheelchair*, [the forward pair of] *each* rotatably mounted [wheels support up to] *wheel supports about* 25% of the weight of the [occupied seat] *person.*

12. The [chair] *motorized wheelchair* as claimed in claim [1] 1 wherein, when a person is seated in the [chair] *seat*, the rotatably mounted wheels support essentially all of the weight of the person.

14. The [chair] *motorized wheelchair* as claimed in claim [9] *1* wherein the at least one drive wheel supports at least 95% of the weight of the [chair] *motorized wheelchair.*

15. [A] *The motorized* wheelchair [comprising:

(a) a longitudinally extending chassis having a front end, a rear end, a central portion positioned there between and opposed sides extending longitudinally between the front and rear ends;

(b) at least one drive wheel mounted on the central portion to engage the surface on which the wheelchair is positioned; and (c) a plurality of rotatably mounted wheels positioned around the chassis in front and behind said at least one drive wheel and mounted below the chassis to engage the surface on which the wheelchair is positioned at a fixed distance] *as claimed in claim 1,* wherein the at least one drive wheel supports [more than] *at least* 90% of the weight of the *motorized* wheelchair when the *motorized* wheelchair is unoccupied.

16. The *motorized* wheelchair as claimed in claim [15] *1* further comprising batteries positioned in forward and rearward compartments, the weight of the batteries being essentially evenly divided between the forward and rearward compartments.

17. The *motorized* wheelchair as claimed in claim [15 further comprising a biasing member to bias the at least one drive wheels to engage the surface on which the wheelchair is situated] *1* wherein the at least one drive wheel supports a minor proportion of the weight of a person when seated in the wheelchair.

*21. The motorized wheelchair as claimed in claim 1 wherein the at least one drive wheel comprises two drive wheels.*

*22. The motorized wheelchair as claimed in claim 1 wherein the at least one drive wheel is rotatably mounted with respect to the motorized wheelchair such that the motorized wheelchair may be driven sideways.*

* * * * *